United States Patent
Takeshita et al.

(10) Patent No.: US 10,231,035 B2
(45) Date of Patent: Mar. 12, 2019

(54) OPTICAL NETWORK CONTROLLER AND OPTICAL NETWORK CONTROL METHOD

(71) Applicant: NEC Corporation, Minato-ku, Tokyo (JP)

(72) Inventors: Hitoshi Takeshita, Tokyo (JP); Tomoyuki Hino, Tokyo (JP); Akio Tajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/914,159

(22) PCT Filed: Sep. 1, 2014

(86) PCT No.: PCT/JP2014/004468
§ 371 (c)(1),
(2) Date: Feb. 24, 2016

(87) PCT Pub. No.: WO2015/033545
PCT Pub. Date: Mar. 12, 2015

(65) Prior Publication Data
US 2016/0212511 A1 Jul. 21, 2016

(30) Foreign Application Priority Data
Sep. 9, 2013 (JP) .................................. 2013-186561

(51) Int. Cl.
*H04Q 11/00* (2006.01)
*H04J 14/02* (2006.01)

(52) U.S. Cl.
CPC .......... *H04Q 11/0005* (2013.01); *H04J 14/02* (2013.01); *H04J 14/0242* (2013.01); *H04J 14/0283* (2013.01); *H04J 14/0287* (2013.01)

(58) Field of Classification Search
CPC combination set(s) only.
See application file for complete search history.

(56) References Cited

U.S. PATENT DOCUMENTS

| | | | |
|---|---|---|---|
| 2012/0224851 A1* | 9/2012 | Takara | H04B 10/0793 398/45 |
| 2014/0205281 A1* | 7/2014 | Sone | H04J 14/0212 398/25 |

FOREIGN PATENT DOCUMENTS

| | | |
|---|---|---|
| JP | 2006-345069 A | 12/2006 |
| JP | 2011-166503 A | 8/2011 |

(Continued)

OTHER PUBLICATIONS

International Search Report for PCT Application No. PCT/JP2014/004468, dated Oct. 7, 2014.

(Continued)

*Primary Examiner* — David C Payne
*Assistant Examiner* — Omar S Ismail

(57) ABSTRACT

In an optical network by a highly dense wavelength division multiplexing system using a flexible frequency grid, it is difficult to improve the optical bandwidth utilization efficiency in the optical network as a whole with improving the fault tolerance, therefore, an optical network controller according to an exemplary aspect of the present invention includes an optical path setting means for selecting a plurality of optical node pairs composed of two optical nodes from among a plurality of optical nodes composing the optical network by a highly dense wavelength division multiplexing system using a flexible frequency grid, and setting, between each of the plurality of optical node pairs, a plurality of optical paths including a first optical path and a second optical path each of which links the optical node pair through various routes; and an optical band setting means for setting respective optical bands based on optical path length and transmission capacity so that an amount of optical bandwidths of the first optical path may become (Continued)

larger than or equal to an amount of optical bandwidths of the second optical path.

7 Claims, 11 Drawing Sheets

(56) References Cited

FOREIGN PATENT DOCUMENTS

WO    2011/030897 A1    3/2011
WO    2012/147889 A1    11/2012

OTHER PUBLICATIONS

English translation of Written opinion for PCT Application No. PCT/JP2014/004468.

\* cited by examiner

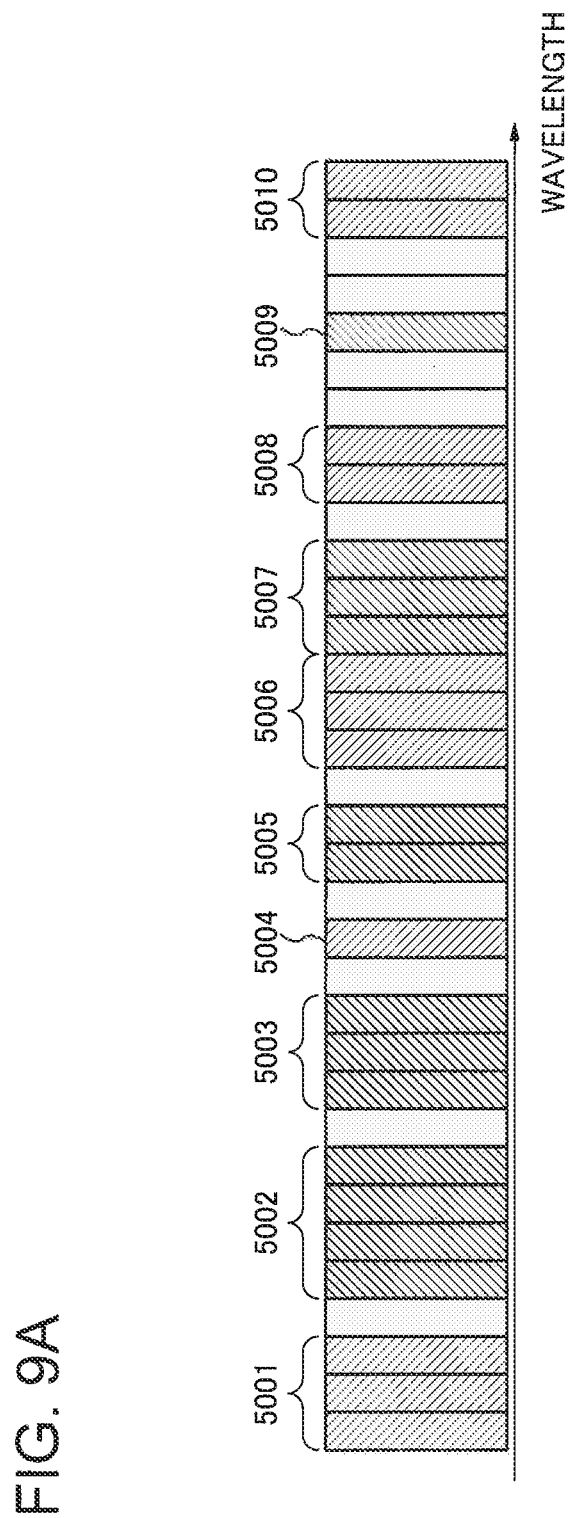

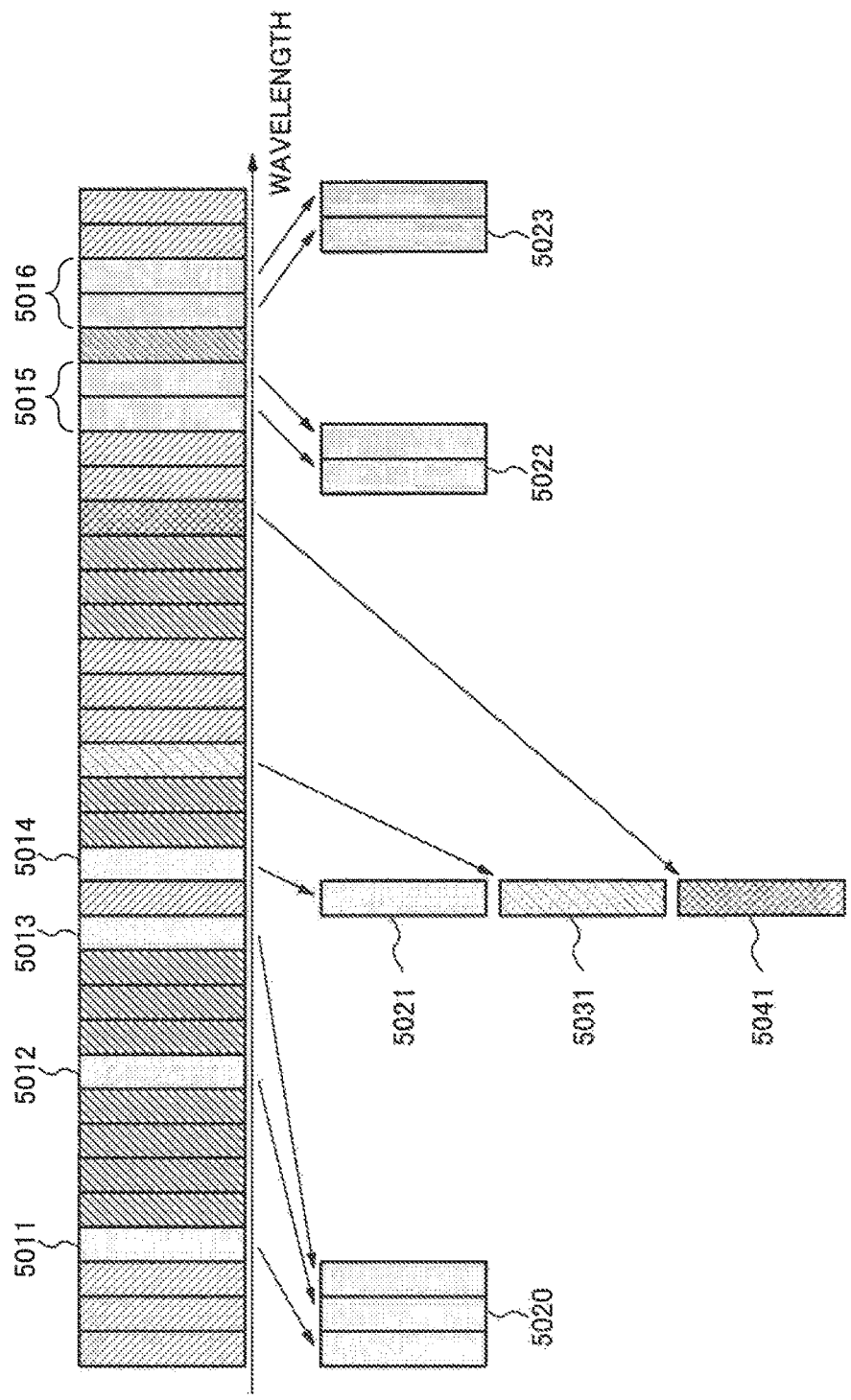

OPTICAL NETWORK CONTROLLER AND OPTICAL NETWORK CONTROL METHOD

This application is a National Stage Entry of PCT/JP2014/004468 filed on Sep. 1, 2014, which claims priority from Japanese Patent Application 2013-186561 filed on Sep. 9, 2013, the contents of all of which are incorporated herein by reference, in their entirety.

TECHNICAL FIELD

The present invention relates to optical network controllers and optical network control methods, in particular, to an optical network controller and an optical network control method that are used for an optical network based on dense wavelength division multiplexing that uses a flexible frequency grid.

BACKGROUND ART

A current challenge for optical communications is to expand the capacities of optical backbone network to cope with the possible future explosive expansion of information communications traffic. Various approaches are being taken to the challenge. One of the approaches is to carry out research and development regarding an improvement in optical bandwidth use efficiency.

In optical networks, optical bandwidths are used in accordance with the Dense Wavelength Division Multiplexing (DWDM) system standardized by the Telecommunication Standardization sector of the International Telecommunication Union (ITU-T). In the DWDM system, the entire available optical bandwidth is divided into narrow segments by a grid with constant width, called a wavelength grid, and optical signals in one wavelength channel are allocated within a grid spacing (ITU-T recommendation G.694.1).

For example, in an optical network with a grid spacing of 50 GHz, an optical bandwidth occupied by any optical signal needs to be less than or equal to 50 GHz. The optical bandwidth occupied by an optical signal with a transmission rate of 40 Gbps (Gigabits per second) is approximately 50 GHz taking into account a guard band for avoiding interference with adjacent channels. Accordingly, if the transmission rates of all optical signals used in an optical network with a grid spacing of 50 GHz are 40 Gbps, the optical bands available in the optical network can be used without any space. However, if there is a 10-Gbps optical signal with an optical bandwidth of approximately 15 GHz among the optical signals, an optical band of 35 GHz in the 50-GHz grid remains unused and cannot be allocated to another optical signal.

Further, focusing on transmission distances, there is the following wasteful allocation of optical bands even if the transmission rates of all optical signals are 40 Gbps in an optical network with a grid spacing of 50 GHz as the above-mentioned example. If all of the optical bands with 50 GHz are occupied, the distance over which an optical signal can be transmitted without optical termination is approximately 500 km. Accordingly, if optical path length is shorter than 500 km, an optical signal can be transmitted with an optical bandwidth narrower than 50 GHz that is actually allocated. For example, an optical path is considered that has a transmission rate of 40 Gbps and an optical path length of 250 km. Assuming that the minimum required optical bandwidth is 25 GHz, an optical bandwidth of 25 GHz is allocated excessively in an optical network with a grid spacing of 50 GHz and may not be allocated to another optical signal.

As a technology to solve these problems, an elastic optical network technique in which a flexible frequency grid is used has been proposed (for example, see PTL 1). The flexible frequency grid is a technique that supports wavelength division multiplexing that is obtained by further sophisticating DWDM and is standardized in ITU-T (ITU-T recommendation G.694.1). In the flexible frequency grid, the grid spacing is fractionized more finely than that of DWDM frequency grid. The grid spacing to be allocated to an optical path is variable and can individually be set for each optical path. This allows a minimum required optical bandwidth to be allocated to an optical path in an elastic optical network depending on the optical path length and traffic amount, which can improve the use efficiency of the optical bands.

CITATION LIST

Patent Literature

[PTL 1] International Publication Number WO 2012/147889

SUMMARY OF INVENTION

Technical Problem

In optical networks, optical paths are allocated taking fault recovery into consideration. In the optical path setting using the open shortest path first (OSPF) protocol, for example, an optical path for an active system is set so that the length of the optical path in the optical network may become shortest. Accordingly, the optical path length of a standby system is longer than the optical path length of the active system.

However, in optical networks using the flexible frequency grid such as the above-mentioned elastic optical network, minimum required bandwidths are allocated depending on optical path lengths and traffic amount. Consequently, the optical bandwidths of optical paths for standby systems are larger than those of optical paths for active systems in the entire optical network. The optical paths for standby systems are essential to ensure the reliability of the optical network, but bands are wastefully allocated in terms of the optical paths for active systems because the optical bands of the optical paths for standby systems are not used unless faults occur. This reduces the use efficiency of the entire optical network.

As mentioned above, there has been a problem that, in an optical network by a highly dense wavelength division multiplexing system using a flexible frequency grid, it is difficult to improve the optical bandwidth utilization efficiency in the optical network as a whole with improving the fault tolerance.

The object of the present invention is to provide an optical network controller and an optical network control method to solve the problem mentioned above.

Solution to Problem

An optical network controller according to an exemplary aspect of the present invention includes an optical path setting means for selecting a plurality of optical node pairs composed of two optical nodes from among a plurality of optical nodes composing the optical network by a highly dense wavelength division multiplexing system using a flexible frequency grid, and setting, between each of the plurality of optical node pairs, a plurality of optical paths including a first optical path and a second optical path each of which links the optical node pair through various routes; and an optical band setting means for setting respective optical bands based on optical path length and transmission capacity so that an amount of optical bandwidths of the first optical path may become larger than or equal to an amount of optical bandwidths of the second optical path.

An optical network control method according to an exemplary aspect of the present invention includes selecting a plurality of optical node pairs composed of two optical nodes from among a plurality of optical nodes composing the optical network by a highly dense wavelength division multiplexing system using a flexible frequency grid; setting, between each of the plurality of optical node pairs, a plurality of optical paths including a first optical path and a second optical path each of which links the optical node pair through various routes; and setting respective optical bands based on optical path length and transmission capacity so that an amount of optical bandwidths of the first optical path may become larger than or equal to an amount of optical bandwidths of the second optical path.

Advantageous Effects of Invention

The optical network controller and the optical network control method of the present invention are capable of improving fault tolerance in an optical network by a highly dense wavelength division multiplexing system using a flexible frequency grid. In addition, the optical network controller and the optical network control method of the present invention are capable of improving the optical bandwidth utilization efficiency in the optical network as a whole.

BRIEF DESCRIPTION OF DRAWINGS

FIG. 9A is a schematic diagram for illustrating another allocation of optical bands to optical paths in an entire optical network, where the allocation is performed using the optical network controller in accordance with the first exemplary embodiment of the present invention.

FIG. 9B is a schematic diagram for illustrating another allocation of optical bands to optical paths in an entire optical network, where the allocation is performed using the optical network controller in accordance with the second exemplary embodiment of the present invention.

DESCRIPTION OF EMBODIMENTS

Exemplary embodiments of the present invention will be described below with reference to the drawings.

[A First Exemplary Embodiment]

Figure 1:
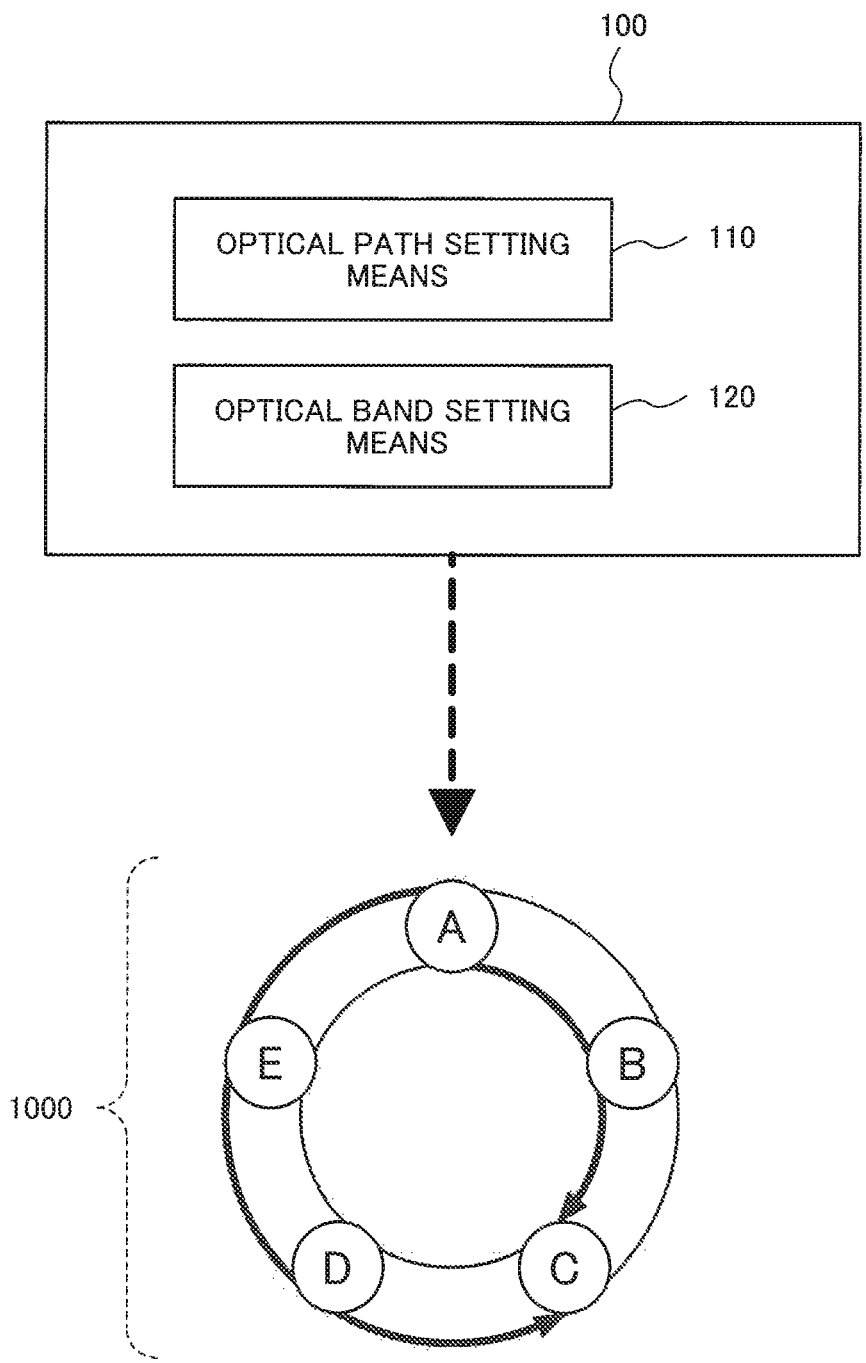
FIG. 1 is a block diagram illustrating a configuration of an optical network controller in accordance with a first exemplary embodiment of the present invention.

FIG. 1 is a block diagram illustrating a configuration of an optical network controller 100 in accordance with a first exemplary embodiment of the present invention.

The optical network controller 100 is used for controlling an optical network 1000 based on a highly dense wavelength division multiplexing system using a flexible frequency grid. The optical network 1000 includes a plurality of optical nodes connected through optical fibers, and a plurality of optical paths can be set which use each optical node as a starting point, a pass point, or ending point.

The optical network controller 100 includes optical path setting means 110 and optical band setting means 120.

The optical path setting means 110 selects a plurality of optical node pairs composed of two optical nodes from among a plurality of optical nodes composing the optical network 1000. The optical path setting means 110 then sets, between each of the plurality of optical node pairs, a plurality of optical paths including a first optical path and a second optical path which link the optical node pair through various routes. The optical band setting means 120 sets respective optical bands based on optical path length and transmission capacity so that the amount of optical bandwidths of the first optical path may become larger than or equal to the amount of optical bandwidths of the second optical path.

This configuration enables the optical network controller 100 of the present exemplary embodiment to improve fault tolerance because a plurality of optical paths are set between the identical optical node pair. In addition, since optical bands are set so that the amount of optical bandwidths of the first optical path may become larger than or equal to the amount of optical bandwidths of the second optical path, the optical bandwidth utilization efficiency in the optical network as a whole can be improved.

Specifically, by allocating the first optical path to an active system optical path and the second optical path to a standby system optical path, fault tolerance can be improved and the optical bandwidth utilization efficiency in the optical network as a whole during operation status can be also improved.

Figure 2:
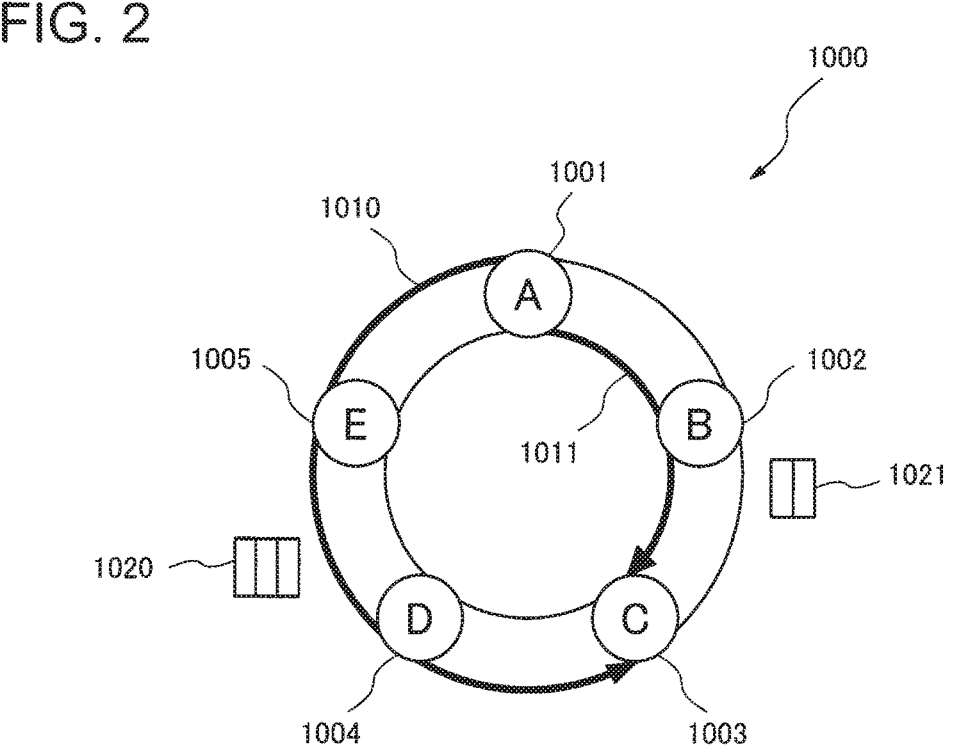
FIG. 2 is a schematic diagram illustrating an exemplary configuration of an optical network.

Optical paths set in the optical network 1000 will now be described with reference to FIG. 2. FIG. 2 is a schematic diagram illustrating an exemplary configuration of the optical network 1000. In the following description, a ring network in which five optical nodes A 1001 to E 1005 are connected in a ring as illustrated in FIG. 2 will be described as an example of the optical network 1000.

Figure 3:
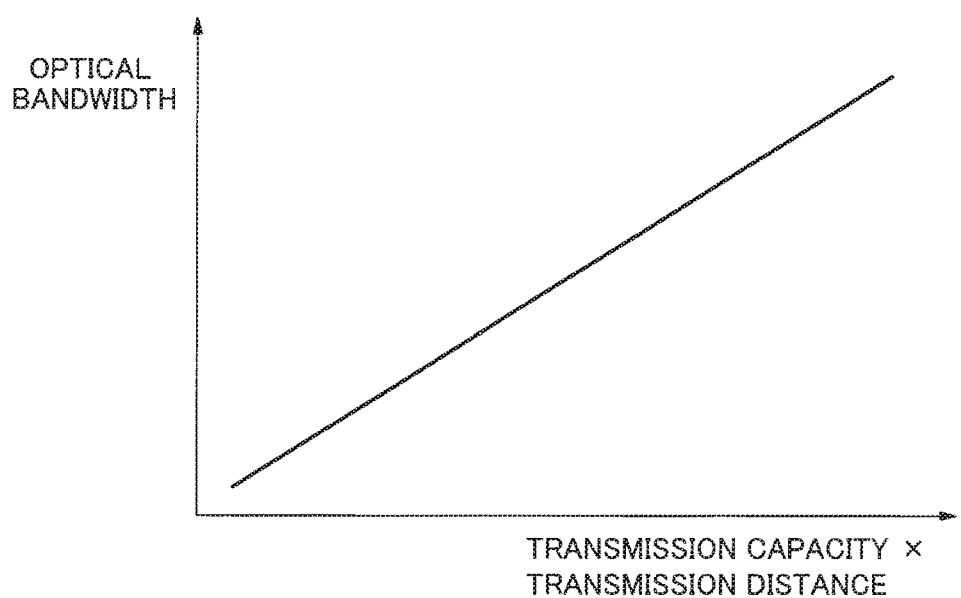
FIG. 3 is an outline graph illustrating the relationship between the product of transmission capacity and transmission distance and optical bandwidth.

If an optical path is set for an optical node pair composed the optical node A 1001 and the optical node C 1003, a clockwise optical path 1011 passing through optical nodes A-B-C and a counterclockwise path 1010 passing through optical nodes A-E-D-C can be set. Assuming that the distance between respective optical nodes is equal to each other for simplicity, the optical path 1010 is longer than the optical path 1011. Accordingly, an optical bandwidth 1020 to be allocated to the optical path 1010 is larger than an optical bandwidth 1021 to be allocated to the optical path 1011. This is because, as shown in FIG. 3, the larger the transmission capacity becomes or the longer the transmission distance becomes, the more optical noise is accumulated, and therefore the amount corresponding to it of an optical signal component, that is, optical bandwidth is required.

Both of the optical path 1011 and the optical path 1010 can be allocated to an active system or a standby system. For example, if the optical path 1011 is allocated to an active system optical path, the optical path 1010 is allocated to a standby system optical path. In this case, in the optical paths between the optical node pair composed of the optical node A 1001 and the optical node C 1003, the bandwidth of the active system optical path is smaller than the bandwidth of the standby system optical path because of the relationship illustrated in FIG. 3.

If there is a connection between other nodes in the ring network 1000 illustrated in FIG. 2, for example, the optical node B is connected to the optical node D, both of two ways of optical paths can be allocated to an active system optical path or a standby system optical path.

If the shorter optical path is allocated to the active system optical path based on the open shortest path first (OSPF) protocol, the optical bandwidth for the active system optical path becomes smaller than the optical bandwidth for the standby system optical path in the optical network as a whole. Once an optical band is set for the standby system optical path, the optical band cannot be used during a normal operation. Consequently, the effective utilization efficiency of the entire optical network decreases.

However, the optical network controller 100 according to the present exemplary embodiment sets optical bands so that the amount of optical bandwidths of one of a plurality of optical paths may become larger than or equal to the amount of optical bandwidths of another optical path. Accordingly, optical bands can be set so that the optical bandwidths of the active system optical paths may become larger than or equal to the optical bandwidths of the standby system optical paths in the optical network as a whole. As a result, it can be avoided that the effective utilization efficiency of the entire optical network decreases.

Next, an operation of the optical network controller 100 according to the present exemplary embodiment will be described in detail.

Figure 4:
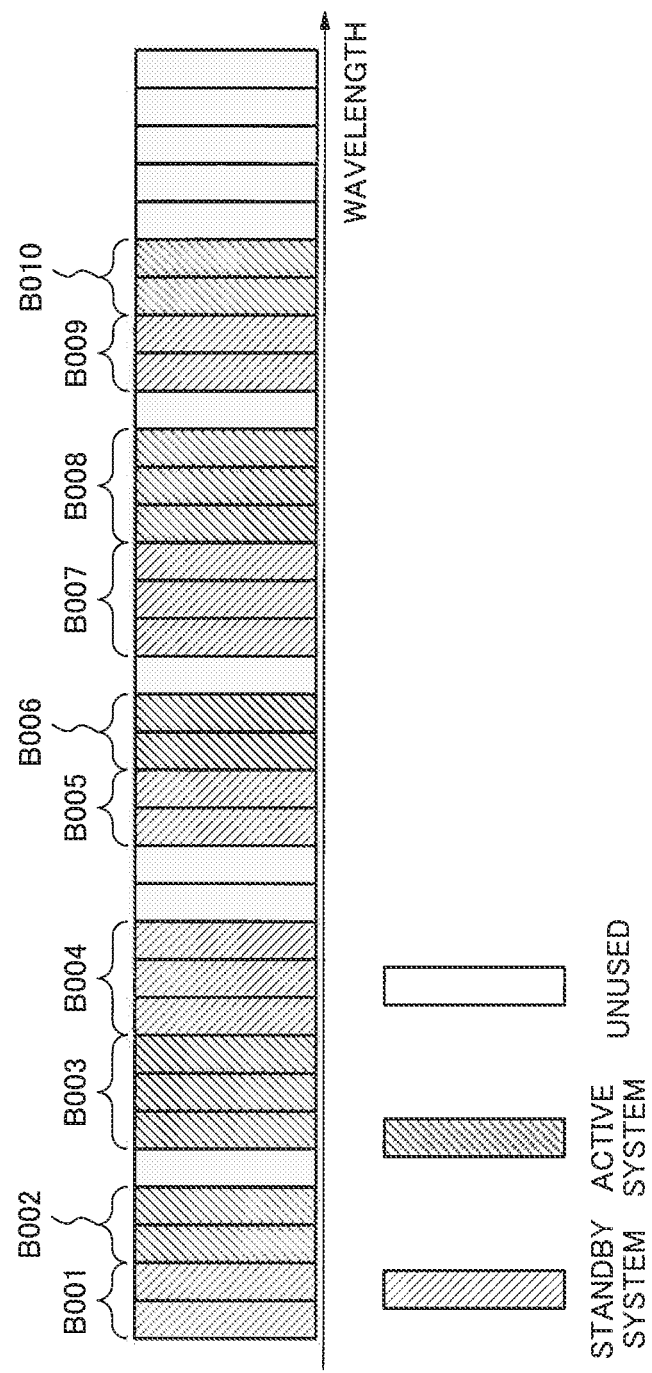
FIG. 4 is a schematic diagram for illustrating optical bands in DWDM using a flexible frequency grid.

First, optical bands in DWDM system using a flexible frequency grid will be described with reference to FIG. 4. FIG. 4 illustrates an example in which the same optical bandwidth is allocated to both of the active system optical path and the standby system optical path regardless of their transmission distances. In FIG. 4, B001 and B002, B003 and B004, - - - , B009 and B010 are pairs of the active system optical path and the standby system optical path, respectively, and optical bands allocated to those optical paths are illustrated. In this case, the same optical bandwidths are always allocated to the active system optical path and the standby system optical path of each pair. Accordingly, there is no difference in the optical bandwidth utilization efficiency of the optical network as a whole which is due to whether individual optical path is used as the active system optical path or the standby system optical path.

Figure 5A:
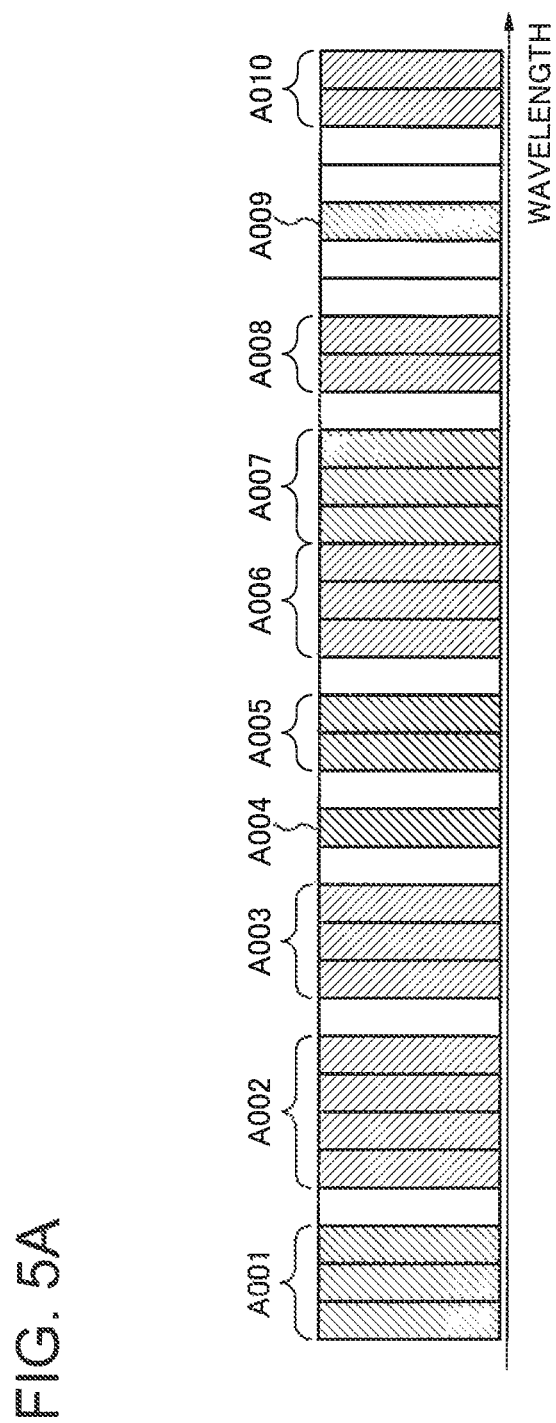
FIG. 5A is a schematic diagram for illustrating allocation of optical bands to optical paths in an entire optical network, where the allocation is based on the OSPF protocol.
Figure 5B:
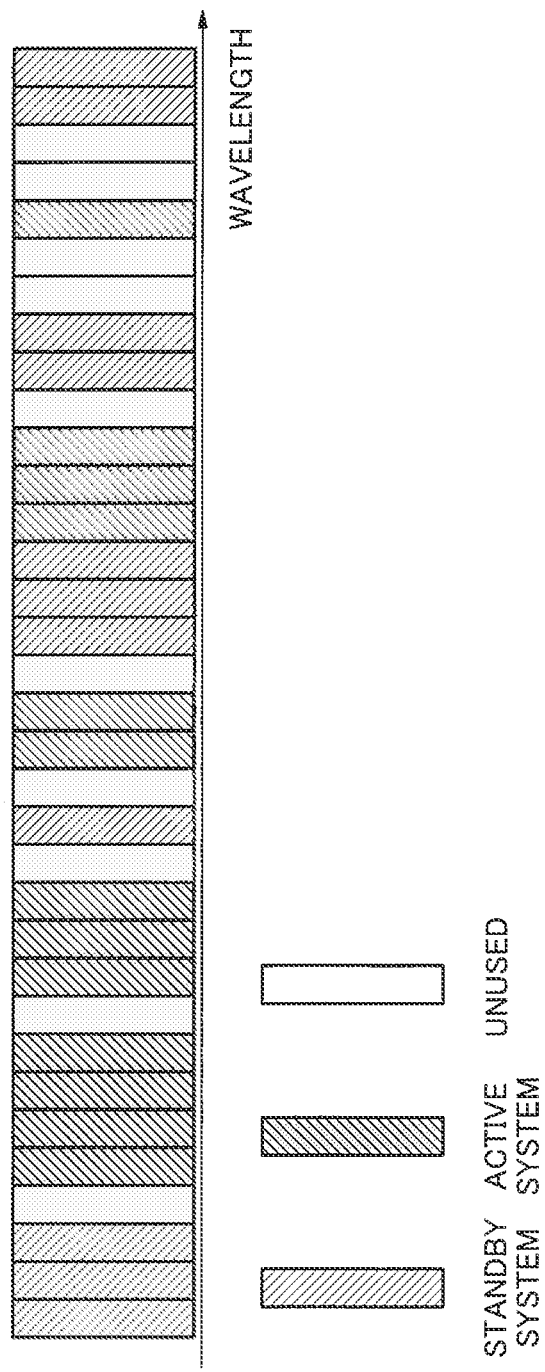
FIG. 5B is a schematic diagram for illustrating allocation of optical bands to optical paths in an entire optical network, where the allocation is performed using the optical network controller in accordance with the first exemplary embodiment of the present invention.

FIGS. 5A and 5B illustrate examples of allocation of optical bands to optical paths in the entire optical network in a case where required minimum optical bandwidths are allocated depending on the transmission distance of the optical path.

FIG. 5A illustrates an example in which optical paths are set based on the OSPF protocol described above. In this case, the shortest optical path is set for an active system optical path. As described with reference to FIG. 3, the product of the transmission capacity and the transmission distance is directly proportional to optical bandwidth to be required for implementing them. Accordingly, the shorter the optical path is, the smaller optical bandwidth to be required is. Therefore, a difference arises between the optical bandwidth to be required for allocation to the active system optical path and the optical bandwidth to be required for allocation to the standby system optical path. Consequently, as illustrated in FIG. 5A, the optical bandwidth of the active system optical path is smaller than the optical bandwidth of the standby system optical path in the optical network as a whole.

In contrast, the optical network controller 100 according to the present exemplary embodiment sets optical bands so that the amount of optical bandwidths of one of the optical paths may become larger than or equal to the amount of optical bandwidths of the other optical path. FIG. 5B illustrates an example of allocation of optical bands to optical paths in the entire optical network in this case. FIG. 5B illustrates a case as an example where optical bands are allocated interchanging the setting of the active system and the setting of the standby system in the pair of optical paths A001 and A002 and the pair of optical paths A003 and A004 described in FIG. 5A. This enables the optical bandwidths of the active system optical paths to become larger than the optical bandwidths of the standby system optical paths in the optical network as a whole.

As mentioned above, since the optical band of the standby system optical path is not used during a normal operation, a problem is caused that the optical bandwidth utilization efficiency of the entire network decreases if the optical band of the standby system optical path increases. The optical network controller 100 according to the present exemplary embodiment, however, can solve the problem because it becomes possible to set optical bands taking into consideration not only the length of the optical path but also the optical bandwidths of the active system optical path and the standby system optical path.

Next, the operation of the optical controller 100 according to the present exemplary embodiment will be described in further detail.

As illustrated in FIG. 2, the optical nodes A 1001 to E 1005 are connected in a ring pattern. Two optical paths are set between the optical node pair composed of optical node A 1001 and optical node C 1003. That is to say, an optical path 1011 is set in which signal light passes through the optical node A 1001, the optical node B 1002, and the optical node C 1003 in the order, and an optical path 1010 is set in which signal light passes through the optical node A 1001, the optical node E 1005, the optical node D 1004, and the optical node C 1003 in the order. It is assumed here that any adjacent pair among the optical nodes 1001 to 1005 has the same distance.

The optical path 1011 and the optical path 1010 are equal in transmission capacity but different in transmission distance. That is to say, the optical path 1011 has two hops, whereas the optical path 1010 has three hops. Referring to the relationship illustrated in FIG. 3, therefore, the optical bandwidth to be allocated to the optical path 1011 is two thirds of the optical bandwidth to be allocated to the optical path 1010. FIG. 2 illustrates the optical band 1021 to be allocated to the optical path 1011 as two slots and the optical band 1020 to be allocated to the optical path 1010 as three slots, where one slot is a unit optical bandwidth.

Figure 6:
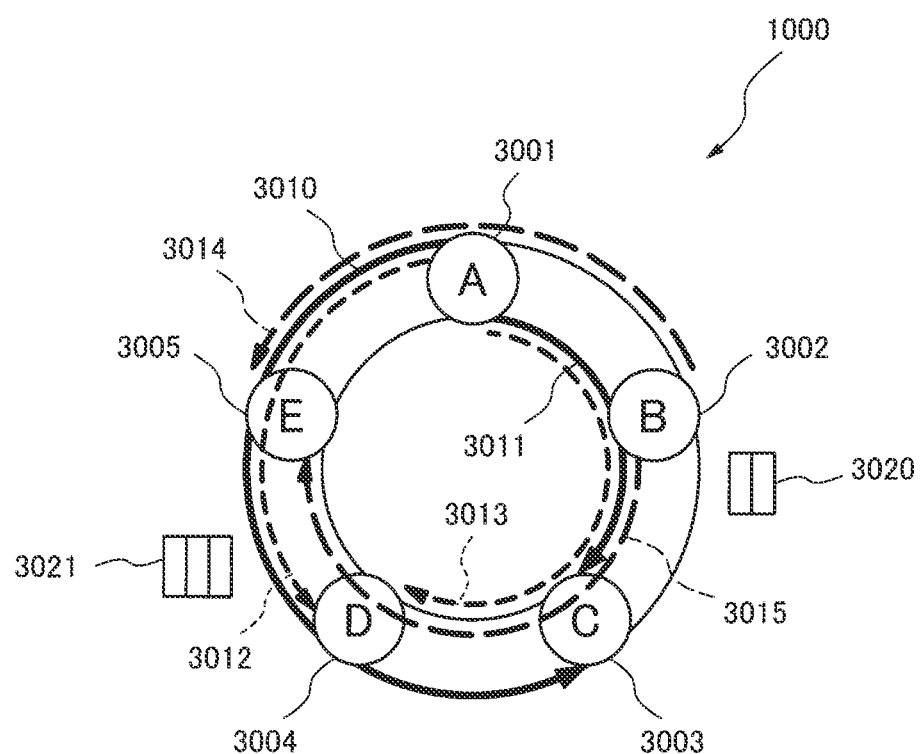
FIG. 6 is a schematic diagram illustrating an exemplary configuration of an optical network for illustrating an operation of the optical network controller in accordance with the first exemplary embodiment of the present invention.

The optical network controller 100 further selects a new optical node pair from among the optical nodes of the optical network 1000 and sets optical paths between the optical node pair. FIG. 6 illustrates an example of a case where optical paths are set between new optical nodes in addition to the setting of the optical paths between the optical nodes illustrated in FIG. 2.

FIG. 6 illustrates a case where a plurality of optical paths are set between respective optical node pairs including an optical node pair composed of an optical node A 3001 and an optical node D 3004 and an optical node pair composed of an optical node B 3002 and an optical node E 3005. That is to say, between the optical node A 3001 and the optical node D 3004, an optical path 3012 connecting the nodes counterclockwise with two hops and an optical path 3013 connecting the nodes clockwise with three hops are set. Similarly, between the optical node B 3002 and the optical node E 3005, an optical path 3014 connecting the nodes counterclockwise with two hops and an optical path 3015 connecting the nodes clockwise with three hops are set.

If optical paths are allocated based on the OSPF protocol described above, the optical path 3012 and the optical path 3014 are allocated to the active system optical paths and the optical path 3013 and the optical path 3015 are allocated to the standby system optical paths because the shortest optical path is allocated to the active system optical path.

Focusing on optical bandwidths to be required, the optical bandwidth required for each of the optical path 3012 and the optical path 3014 is two-slot width and, the optical bandwidth required for each of the optical path 3013 and the optical path 3015 is three-slot width. Accordingly, optical bandwidths to be allocated to the active system optical path in the entire optical network is two-slot width for each of the optical path 3011 (1011), the optical path 3012, and the optical path 3014, and therefore six-slot width in total. On the other hand, optical bandwidths to be allocated to the standby system optical path is three-slot width for each of the optical path 3010 (1010), the optical path 3013, and the optical path 3015, and therefore nine-slot width in total. The optical bandwidth of the active system optical path is used for optical communications during a normal operation, whereas the optical bandwidth of the standby system optical path is not used during a normal operation. However, if optical paths are allocated based on the OSPF protocol, the optical bandwidth of the standby system optical path which is not used during a normal operation exceeds the optical bandwidth of the active system optical path as described above. Consequently, the effective utilization efficiency of the entire optical network decreases.

On the other hand, according to the optical network controller 100 of the present exemplary embodiment, optical bands are set respectively so that the optical bandwidths of the active system optical paths in the entire optical network may become larger than or equal to the optical bandwidths of the standby system optical paths. Specifically, the optical path 3012 and the optical path 3014 are allocated to the standby system optical paths, and the optical path 3013 and the optical path 3015 are allocated to the active system optical paths, for example. Consequently, the optical bandwidth of the active system optical paths in the entire optical network is two-slot width for the optical path 3011 (1011) and three-slot width for each of the optical path 3013 and the optical path 3015, and therefore eight-slot width in total. On the other hand, the optical bandwidth of the standby system optical paths is three-slot width for the optical path 3010 (1010) and two-slot width for each of the optical path 3012 and the optical path 3014, and therefore seven-slot width in total. That is to say, the optical bandwidth to be allocated to the active system optical path can be made larger than the optical bandwidth to be allocated to the standby system optical path. As a result, the effective optical bandwidth utilization efficiency in the entire optical network can be prevented from decreasing.

Next, an optical network control method according to the present exemplary embodiment will be described. The optical network control method according to the present exemplary embodiment controls an optical network by a highly dense wavelength division multiplexing system using a flexible frequency grid.

The optical network control method according to the present exemplary embodiment, first, selects a plurality of optical node pairs composed of two optical nodes from among a plurality of optical nodes composing an optical network. Between each of the plurality of optical node pairs, optical paths including a first optical path and a second optical path are set which link the optical node pair through various routes. Respective optical bands are set based on optical path length and transmission capacity so that the amount of optical bandwidths of the first optical path may become larger than or equal to the amount of optical bandwidths of the second optical path.

Further, in setting optical paths, the first optical path can be allocated to an active system optical path, and the second optical path can be allocated to a standby system optical path.

As described above, the optical network controller and the optical network control method according to the present exemplary embodiment are capable of improving the optical bandwidth utilization efficiency in an optical network as a whole. The reason is as follows. The optical network controller and the control method according to the present exemplary embodiment allocate minimum required optical bandwidths depending on optical path length and traffic amount (communication capacity) and set optical bands so that optical bandwidths allocated to active system optical paths may become larger than optical bandwidths allocated to standby system optical paths. This makes it possible to increase optical bands actually used in the optical network as a whole, and therefore an effective optical bandwidth increases.

[A Second Exemplary Embodiment]

Figure 7:
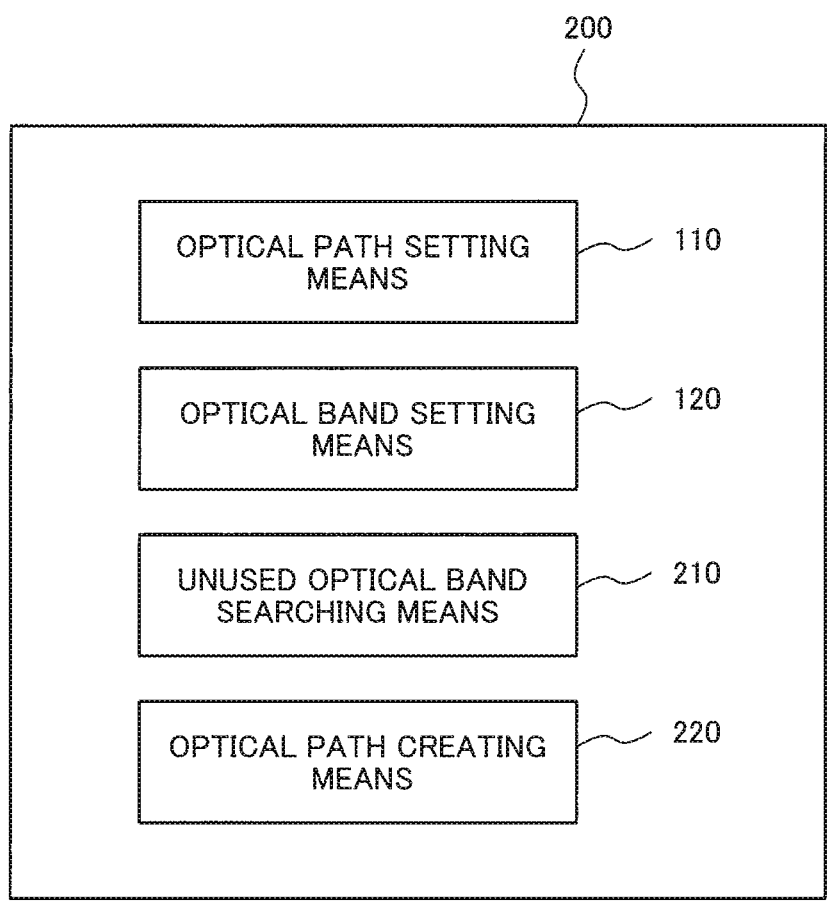
FIG. 7 is a block diagram illustrating a configuration of an optical network controller in accordance with a second exemplary embodiment of the present invention.

Next, a second exemplary embodiment of the present invention will be described. FIG. 7 is a block diagram illustrating a configuration of an optical network controller 200 in accordance with the second exemplary embodiment of the present invention.

The optical network controller 200 is used for controlling an optical network based on a highly dense wavelength division multiplexing system using a flexible frequency grid, and includes optical path setting means 110 and optical band setting means 120. The configurations and operations of these means are the same as those of the optical network controller 100 according to the first exemplary embodiment.

The optical network controller 200 further includes unused optical band searching means 210 and optical path creating means 220. The unused optical band searching means 210 searches for an unused optical band in the optical network. The optical path creating means 220 creates a new optical path by wavelength-multiplexing a plurality of unused optical bands, whose central wavelengths differ from each other, which are included in what the unused optical band searching means 210 has searched for. The optical path setting means 110 can allocate the new optical path to one of an active system optical path and a standby system optical path.

This configuration enables the optical network controller 200 of the present exemplary embodiment to use up available optical bands in the entire network. The reason is as follows. The optical network controller 200 of the present exemplary embodiment can create a new optical path by wavelength-multiplexing remaining unused optical bands after setting active system optical paths and standby system optical paths to be required. This makes it possible to eliminate unused optical bands that cannot be allocated to optical paths in the optical network.

In addition, the optical network controller 200 of the present exemplary embodiment can improve the reliability of the network. This is because it becomes possible to prepare against multiple failures by using, as an additional standby system optical path, a new optical path created by utilizing remaining unused optical bands.

In this regard, after the optical bandwidth utilization efficiency of active system optical paths has been maximized, independently of which, an additional standby system optical path is created by utilizing remaining unused optical bands, which enables to prepare against multiple failures. It is possible, therefore, to improve the optical bandwidth utilization efficiency and the reliability of the optical network at the same time.

Next, an operation of the optical network controller 200 according to the present exemplary embodiment will be described in detail with reference to FIGS. 8A and 8B. As described above, the optical network controller 200 creates a new optical path by wavelength-multiplexing a plurality of discrete unused optical bands.

Figure 8A:
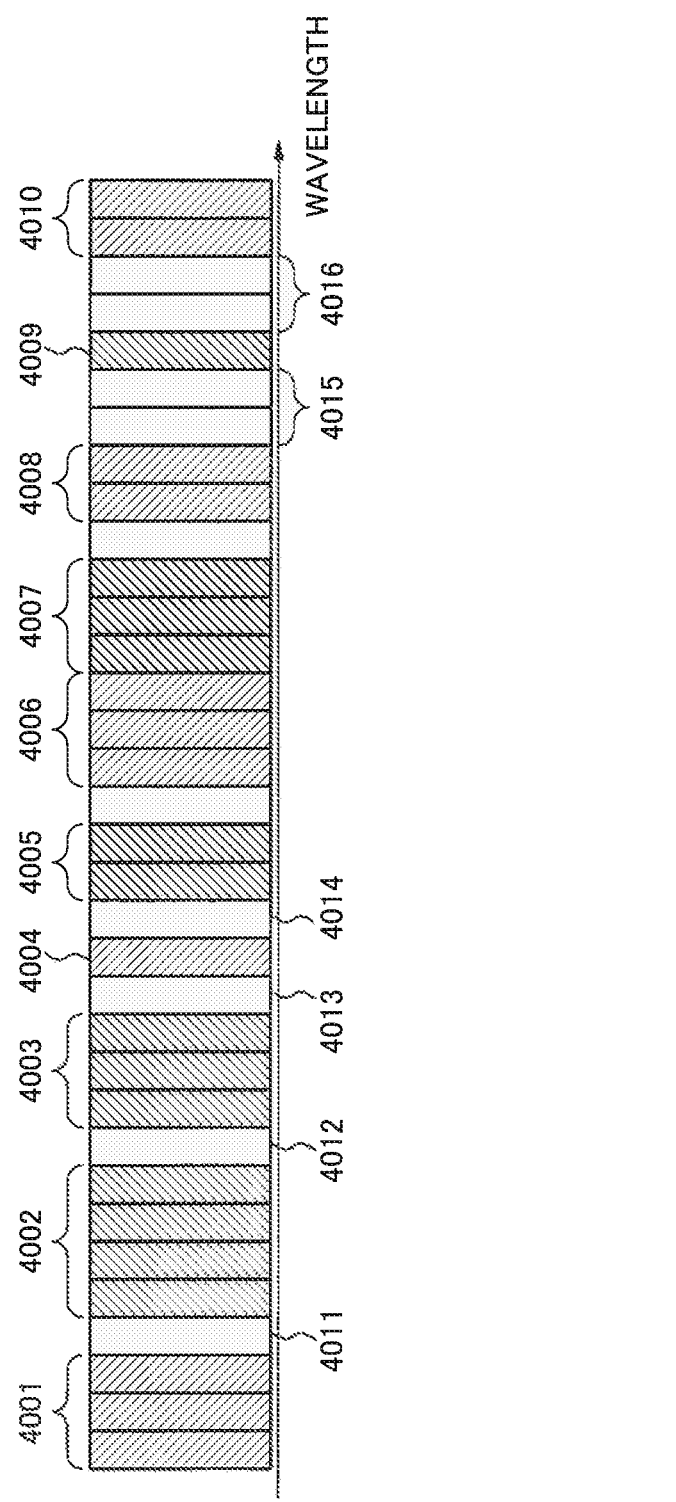
FIG. 8A is a schematic diagram for illustrating allocation of optical bands to optical paths in an entire optical network, where the allocation is performed using the optical network controller in accordance with the first exemplary embodiment of the present invention.
Figure 8B:
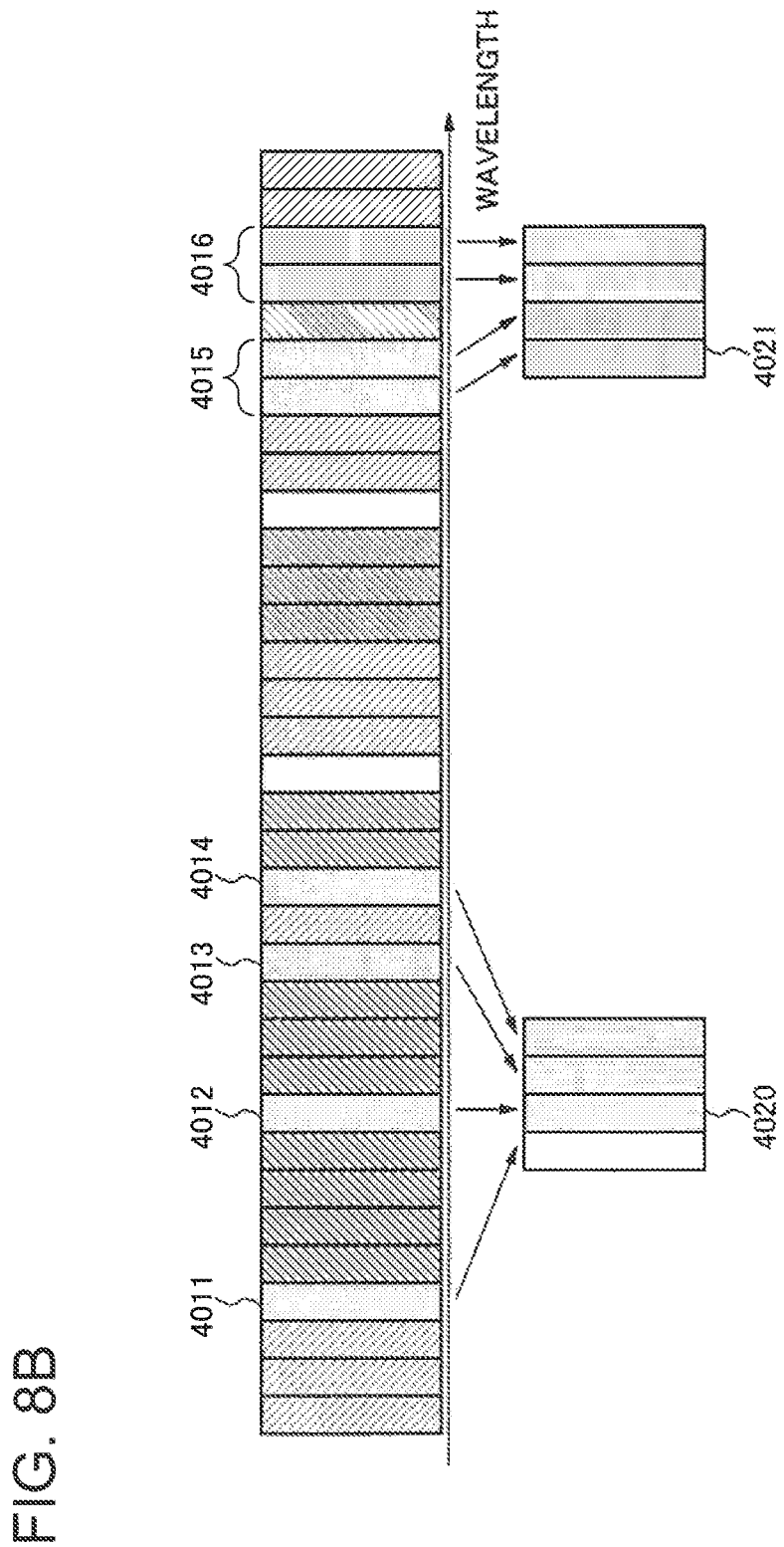
FIG. 8B is a schematic diagram for illustrating allocation of optical bands to optical paths in an entire optical network, where the allocation is performed using the optical network controller in accordance with the second exemplary embodiment of the present invention.

FIGS. 8A and 8B are schematic diagrams illustrating allocation of optical bands to optical paths in the entire optical network. FIG. 8A is the same as FIG. 5B, and illustrates optical bands allocated to active system optical paths and standby system optical paths by the optical network controller 200 as is the case with the optical network controller 100 according to the first exemplary embodiment. In this case, when unused optical bands remain, the optical network controller 200 collects the unused optical bands and wavelength-multiplexes them, and creates new optical paths as illustrated in FIG. 8B. In the example illustrated in FIGS. 8A and 8B, the optical bands 4011 to 4016 are unused optical bands that remain unused in the entire optical network after optical bands have been allocated to the active system optical paths and standby system optical paths.

As illustrated in FIG. 8B, if optical bands of four slots are required to create new optical paths, for example, the individual unused optical bands 4011 to 4016 alone cannot meet the condition of creation. The optical network controller 200 makes unused optical bands as a whole satisfy the condition of creating new optical paths by wavelength-multiplexing a plurality of unused optical bands. In the example illustrated in FIG. 8B, it becomes possible to create two new optical paths 4020 and 4021 by wavelength-multiplexing the unused optical bands 4011 to 4014 and the unused optical bands 4015 and 4016, respectively.

The new optical paths created by wavelength-multiplexing in this way can be used for both of the active system optical path and the standby system optical path. In FIG. 8B, for example, a new optical path can be used as an additional active system optical path for optical band 4002 forming the active system optical path by an optical band of four slots. In this case, since two new optical paths are created in the entire optical network, the optical bandwidth utilization efficiency can be improved.

Specifically, in the example illustrated in FIGS. 8A and 8B, the unused optical bands are ten slots as illustrated in FIG. 8A without creating new optical paths according to the present exemplary embodiment. In contrast, according to the present exemplary embodiment, the unused optical bands becomes two slots as illustrated in FIG. 8B. The optical bands in the entire optical network are 34 slots, and therefore it can be seen that the utilization efficiency of the optical network increases before and after implementing the present exemplary embodiment from approximately 70% (((34−10)/34)×100) to approximately 94% (((34−2)/34)×100). That is to say, the optical network controller 200 according to the present exemplary embodiment can improve the optical bandwidth utilization efficiency in the optical network by 24% in the example illustrated in FIGS. 8A and 8B.

The optical network controller 200 of the present exemplary embodiment can also allocate new optical paths created by wavelength-multiplexing unused optical bands to standby system optical paths. For example, the new optical paths can be utilized as additional standby system optical paths for the standby system optical paths allocated to the optical bands 4001 and 4006 of three slots. This enables the fault tolerance of the optical network to improve further because it becomes possible to deal with double failures as well.

Specifically, in the example illustrated in FIGS. 8A and 8B, the following five pairs are set as a pair of the active system optical path and the standby system optical path. That is, they are five pairs of (4001, 4002), (4003, 4004), (4005, 4006), (4007, 4008), and (4009, 4010). The standby system optical paths are therefore one-hundred percent prepared for the active system optical paths. In this case, the optical network controller 200 of the present exemplary embodiment enables to deal with double failures in two pairs. That is to say, there are pairs of the active system optical path and the standby system optical path of (4001+(4011 to 4014), 4002), (4003, 4004), (4005, 4006+(4015 to 4016)), (4007, 4008), and (4009, 4010). Assuming the failure recovery rate in a case of dealing with double failures to be 200%, the failure recovery rate of the entire optical network is equal to 140% (=(2×200+3×100)/5). Thus, the optical network controller 200 according to the present exemplary embodiment can improve the failure recovery rate by 40% from 100% to 140%.

Next, another operation of the optical network controller 200 according to the present exemplary embodiment will be described in detail with reference to FIGS. 9A and 9B. In this case, the optical network controller 200 employs a first operation policy of improving the optical bandwidth utilization efficiency and a second operation policy of increasing the failure recovery rate, and operates giving priority to the first operation policy. That is to say, the optical network controller 200 allocates optical bands giving priority to improvement of the optical bandwidth utilization efficiency.

FIGS. 9A and 9B are schematic diagrams illustrating optical band allocation to optical paths in the entire optical network. FIG. 9A is the same as FIG. 8A, and illustrates optical bands allocated to active system optical paths and standby system optical paths by the optical network controller 200 as is the case with the optical network controller 100 according to the first exemplary embodiment.

In this condition, the optical network controller 200 minimizes the number of the slot in the unused optical band according to the first operation policy. Next, the optical network controller 200 operates so as to maximize the number of additional standby system optical paths according to the second operation policy. In this operation, the optical path setting means 110 of the optical network controller 200 can allocate new optical paths as additional standby system optical paths for the standby system optical path in ascending order of optical bandwidth to be required for the standby system optical path. This makes it possible to maximize the number of the additional standby system optical paths with minimizing unused optical bands.

The allocation of the optical bands will be described specifically with reference to FIG. 9B. Unused optical bands are allocated as additional standby system optical bands 5020 to 5023 in ascending order of the optical bandwidth to be required among the optical bands for the standby system optical path. That is to say, the unused optical bands are allocated in order of the optical bands 5004 (one slot), 5008 (two slots), 5010 (two slots), 5001 (three slots), and 5006 (three slots). Since the number of slots of unused optical bands is equal to ten in total in the example illustrated in FIGS. 9A and 9B, no optical band is allocated to an additional standby system optical path for the optical band 5006 (three slots) for the standby system optical path. Accordingly, an unused optical band of two slots remains unallocated.

Then, unused optical bands are allocated again. In this time, the optical network controller 200 also operates giving priority to the first operation policy of improving the optical bandwidth utilization efficiency over the second operation policy of increasing the failure recovery rate.

Since the unused optical band includes two slots in this time, the allocation process is ended by allocating an additional standby system optical band 5031 as a second additional standby system optical path for the optical band 5004 (one slot) for the standby system optical path. Then similar allocation processes are repeated. When an additional standby system optical band 5041 has been allocated as an additional standby system optical path for the optical band 5004, the allocation process of unused optical bands is completed because the number of the slot of the unused optical band becomes zero.

As a result, the number of the slot of the unused optical band varies from ten to zero before and after the operation according to the present exemplary embodiment. The additional standby system optical path is quadrupled for the optical band 5004, and duplicated for each of the optical bands 5008, 5010 and 5001. Accordingly, the optical bandwidth utilization efficiency in the optical network increases from approximately 70% (((34−10)/34)×100) to 100% (((34−0)/34)×100), and the failure recovery rate becomes 220% ((1×400+3×200+1×100)/5). That is to say, the optical network controller 200 according to the present exemplary embodiment can increase the failure recovery rate approximately double with maximizing the optical bandwidth utilization efficiency in the optical network at 100%.

Next, an optical network control method according to the present exemplary embodiment will be described. The optical network control method controls an optical network by a highly dense wavelength division multiplexing system using a flexible frequency grid.

The optical network control method according to the present exemplary embodiment, first, selects a plurality of optical node pairs composed of two optical nodes from among a plurality of optical nodes composing the optical network. Between each of the plurality of optical node pairs, optical paths including a first optical path and a second optical path are set which link the optical node pair through various routes. Respective optical bands are set based on optical path length and transmission capacity so that the amount of optical bandwidths of the first optical path may become larger than or equal to the amount of optical bandwidths of the second optical path. Further, in setting optical paths, the first optical path can be allocated to an active system optical path, and the second optical path can be allocated to a standby system optical path.

The steps so far are the same as those of the optical network control method according to the first exemplary embodiment. The optical network control method according to the present exemplary embodiment searches for an unused optical band in the optical network further. A new optical path is created by wavelength-multiplexing a plurality of unused optical bands, whose central wavelengths differ from each other, which are obtained from search results. In setting optical paths, the new optical path can be allocated to one of an active system optical path and a standby system optical path. Alternatively, in setting optical paths, the new optical paths may be allocated as additional standby system optical paths for the standby system optical path in ascending order of optical bandwidth of the standby system optical path.

As described above, according to the optical network controller and the optical network control method of the present exemplary embodiment, it is possible to improve the optical bandwidth utilization efficiency and the reliability in the optical network independently.

That is to say, if all of new optical paths created using unused optical bands are newly set for the active system optical path, the effective transmission capacity of the optical network increases. On the other hand, if all of new optical paths are set for the standby system optical path, the fault tolerance increases for the active system optical path because it becomes possible to deal with multiple failures. It is also possible to set a ratio in allocation of new optical paths to the active system optical path and the standby system optical path. Therefore, the ratio in allocation to the active system optical path can be increased if a user demands a high-capacity transmission, and the ratio in allocation to the standby system optical path can be increased if a user demands reliability. This allows setting and control of the optical path that meet the demands of users.

In the present exemplary embodiment, it has been described that the optical network controller 200 employs the first operation policy of improving the optical bandwidth utilization efficiency and the second operation policy of increasing the failure recovery rate, and operates giving priority to the first operation policy. The operations are not limited to this, however, the optical network controller 200 can employ the first operation policy of allocating more optical bandwidths to the active system optical path than to the standby system optical path and the second operation policy of maximizing the number of additional standby system optical paths. In this case, if there are a plurality of ways to allocate optical bands to optical paths based on the first operation policy, the second operation policy is applied as an operation policy dependent on the first operation policy. This makes it possible to increase the failure recovery rate of the entire optical network with maximizing the optical bandwidth allocated to the active system optical path.

In this case, it may be adopted as the second operation policy to maximize the efficiency of reduction of power consumption by maximizing the number of optical cut-through operations at relay optical nodes for the active system optical path in the optical network. If there are a plurality of ways to allocate optical bands to optical paths based on the first operation policy, the second operation policy is applied as an operation policy dependent on the first operation policy. This makes it possible to increase the efficiency of reduction of power consumption in the entire optical network with maximizing the optical bandwidth allocated to the active system optical path.

Contrary to those cases, more priority may be given to improvement of the failure recovery rate or the efficiency of reduction of power consumption than to improvement of the optical bandwidth utilization efficiency by making the first operation policy an operation policy dependent on the second operation policy. This enables to improve the optical bandwidth utilization efficiency and, at the same time, the failure recovery rate or the efficiency of reduction of power consumption.

In addition to the first operation policy of maximizing the optical bandwidth utilization efficiency, a plurality of operation policies can be added or deleted in response to users' requests, such as maximizing the efficiency of reduction of power consumption and improving the failure recovery rate. It is possible to support the functions that users prioritize by making degrees of priority of the plurality of operation policies changeable.

In addition, the whole of the optical network may be divided into a plurality of domains, and an operation policy may be set for each of the domains. This enables to respond to users' requests for each domain.

According to the optical network controllers and the optical network control methods of the above-described exemplary embodiments, since the optical bandwidth utilization efficiency is improved, it becomes possible to accommodate more traffic without changing hardware. Accordingly, the transmission capacity can be expanded at low cost. The optical network controllers and the optical control methods according to the above-described embodiments can be configured by software, and therefore they can be implemented at low cost. In addition, the configurations according to the above-described exemplary embodiments are independent of the size and topology of the optical network. Therefore, the optical network controllers and the optical network control methods according to the above-described exemplary embodiments can be used even if the numbers of nodes and optical paths increase. As a result, the effect of high scalability can be achieved.

The present invention has been described by taking the exemplary embodiments described above as model examples. However, the present invention is not limited to the aforementioned exemplary embodiments. The present invention can be implemented in various modes that are apparent to those skilled in the art within the scope of the present invention.

This application is based upon and claims the benefit of priority from Japanese Patent Application No. 2013-186561, filed on Sep. 9, 2013, the disclosure of which is incorporated herein in its entirety by reference.

REFERENCE SIGNS LIST 100, 200 Optical network controller
110 Optical path setting means
120 Optical band setting means
210 Unused optical band searching means
220 Optical path creating means
1000 Optical network
1001-1005, 3001-3005 Optical node
1010, 1011, 3010-3015 Optical path
1020, 1021, A001-A010, B001-B010, 3020, 3021, 4001-4010, 5001-5010 Optical band
4011-4016, 5011-5016 Unused optical band
4020, 4021 New optical path
5020-5023, 5031, 5041 Additional standby system optical band

What is claimed is:

1. An optical network controller, comprising:
at least one processor configured to execute software and thereby implement:
an optical path setting unit, as a first software element, configured to:
select a plurality of optical node pairs composed of two optical nodes from among a plurality of optical nodes composing the optical network by a highly dense wavelength division multiplexing system using a flexible frequency grid,
set, between each of the plurality of optical node pairs, a plurality of optical paths including a first optical path and a second optical path each of which links the optical node pair through various routes, and
allocate the first optical path to an active system optical path, and allocate the second optical path to a standby system optical path,
an unused optical band searching unit, as a second software element, configured to search for an unused optical band in the optical network,
an optical band setting unit, as a third software element, configured to set respective optical bands based on optical path length and transmission capacity so that an amount of optical bandwidths of active system optical paths in the optical network as a whole may become larger than or equal to an amount of optical bandwidths of standby system optical paths in the optical network as a whole, and
an optical path creating unit, as a fourth software element, configured to create a new optical path by wavelength-multiplexing a plurality of unused optical bands, whose central wavelengths differ from each other, which are included in what the unused optical band searching unit has searched for, in order to reserve optical bandwidths corresponding to an amount of optical bandwidths of the optical paths that the optical band setting unit has set.

2. The optical network controller according to claim 1, wherein the optical path setting unit allocates the new optical path to one of the active system optical path and the standby system optical path.

3. The optical network controller according to claim 1, wherein the optical path setting unit allocates the new optical path as an additional standby system optical path for the standby system optical path in ascending order of the optical bandwidths for the standby system optical path.

4. An optical network control method, comprising:
selecting a plurality of optical node pairs composed of two optical nodes from among a plurality of optical nodes composing the optical network by a highly dense wavelength division multiplexing system using a flexible frequency grid;

setting, between each of the plurality of optical node pairs, a plurality of optical paths including a first optical path and a second optical path each of which links the optical node pair through various routes;

allocating the first optical path to an active system optical path;

allocating the second optical path to a standby system optical path;

searching for an unused optical band in the optical network;

setting respective optical bands based on optical path length and transmission capacity so that an amount of optical bandwidths of active system optical paths in the optical network as a whole may become larger than or equal to an amount of optical bandwidths of standby system optical paths in the optical network as a whole; and creating a new optical path by wavelength-multiplexing a plurality of unused optical bands, whose central wavelengths differ from each other, which are included in results of the searching, in order to reserve optical bandwidths corresponding to an amount of optical bandwidths of the optical paths set.

5. The optical network control method according to claim 4,
wherein the setting of the plurality of optical paths includes allocating the new optical path to one of the active system optical path and the standby system optical path.

6. The optical network control method according to claim 4,
wherein the setting of the plurality of optical paths includes allocating the new optical path as an additional standby system optical path for the standby system optical path in ascending order of the optical bandwidths for the standby system optical path.

7. An optical network controller, comprising:
at least one processor configured to execute software and thereby implement:
an optical path setting unit, as a first software element, configured to:
select a plurality of optical node pairs composed of two optical nodes from among a plurality of optical nodes composing the optical network by a highly dense wavelength division multiplexing system using a flexible frequency grid, and
set, between each of the plurality of optical node pairs, a plurality of optical paths including a first optical path and a second optical path each of which links the optical node pair through various routes, and
an optical band setting unit, as a second software element, configured to:
set respective optical bands based on optical path length and transmission capacity so that an amount of optical bandwidths of the first optical path for the plurality of optical node pairs may become larger than or equal to an amount of optical bandwidths of the second optical path for the plurality of optical node pairs, and
allocate the first optical path to an active system optical path and the corresponding second optical path to a standby system optical path;
an unused optical band searching unit, as a third software element, configured to search for an unused optical band in the optical network; and
an optical path creating unit, as a fourth software element, configured to create a new optical path by wavelength-multiplexing a plurality of unused optical bands, whose central wavelengths differ from each other, which are included in what the unused optical band searching unit has searched for, wherein
the optical path setting unit allocates the new optical path as an additional standby system optical path for the standby system optical path in ascending order of the optical bandwidths for the standby system optical path.

* * * * *